(12) United States Patent
Kuang

(10) Patent No.: US 9,950,947 B2
(45) Date of Patent: Apr. 24, 2018

(54) OPTICAL GLASS AND OPTICAL ELEMENT

(71) Applicant: CDGM GLASS CO., LTD, Chengdu, Sichuan (CN)

(72) Inventor: Bo Kuang, Chengdu (CN)

(73) Assignee: CDGM GLASS CO., LTD, Sichuan (CN)

( * ) Notice: Subject to any disclaimer, the term of this patent is extended or adjusted under 35 U.S.C. 154(b) by 0 days.

(21) Appl. No.: 15/025,763

(22) PCT Filed: Jan. 16, 2015

(86) PCT No.: PCT/CN2015/070844
§ 371 (c)(1),
(2) Date: Mar. 29, 2016

(87) PCT Pub. No.: WO2015/109969
PCT Pub. Date: Jul. 30, 2015

(65) Prior Publication Data
US 2016/0244355 A1    Aug. 25, 2016

(30) Foreign Application Priority Data

Jan. 23, 2014 (CN) .......................... 2014 1 0033342

(51) Int. Cl.
*C03C 3/19* (2006.01)
*C03C 3/17* (2006.01)
*G02B 1/04* (2006.01)

(52) U.S. Cl.
CPC ................. *C03C 3/19* (2013.01); *C03C 3/17* (2013.01); *G02B 1/041* (2013.01)

(58) Field of Classification Search
CPC ................ C03C 3/17; C03C 3/19; C03C 3/21
See application file for complete search history.

(56) References Cited

U.S. PATENT DOCUMENTS

| 7,598,189 B2 | 10/2009 | Fujiwara et al. |
| 7,799,714 B2 | 9/2010 | Fujiwara |
| 2004/0259714 A1* | 12/2004 | Fujiwara ................... C03B 7/12 501/45 |
| 2006/0150682 A1 | 7/2006 | Fujiwara et al. |
| 2007/0111875 A1 | 5/2007 | Fujiwara |
| 2012/0035042 A1* | 2/2012 | Kitaoka ................... C03C 3/068 501/47 |

FOREIGN PATENT DOCUMENTS

| CN | 1754851 A | | 4/2006 | |
| CN | 1974453 A | | 6/2007 | |
| JP | 2004-168593 A | | 6/2004 | |
| JP | 2004168593 A | * | 6/2004 | ............... C03C 3/19 |
| JP | 2010138069 A | * | 6/2010 | |
| JP | 2010202418 A | * | 9/2010 | |
| JP | WO 2011013505 A1 | * | 2/2011 | ............. C03C 3/064 |
| JP | 2011241128 A | * | 12/2011 | |

OTHER PUBLICATIONS

Apr. 13, 2015 Search Report issued in International Patent Application No. PCT/CN2015/070844.

* cited by examiner

*Primary Examiner* — Elizabeth A. Bolden
(74) *Attorney, Agent, or Firm* — Oliff PLC

(57) ABSTRACT

The invention provides an optical glass with rather low transition temperature, high transmittance, chemical stability and good devitrification resistance, wherein the refractive index is 1.60-1.65 and the Abbe number is 62-66. The optical glass comprises, by weight percentage, 30-50% of $P_2O_5$, 35-50% of BaO, 2-6% of $B_2O_3$, 0-5% of $La_2O_3$, 0-5% of $Gd_2O_3$, 0.1-5% of $Al_2O_3$, 0.1-5% of $Li_2O$, 2-10% of MgO, and 2-10% of CaO. According to the present invention, $P_2O_5$ is applied as the network generation body of glass so as to give high transmittance to the glass; a large amount of BaO is a key component for improving the transmittance of glass while improving the refractive index and weather durability of glass, and also the advantages of low transition temperature, good chemical stability and good devitrification resistance are provided.

17 Claims, No Drawings

OPTICAL GLASS AND OPTICAL ELEMENT

TECHNICAL FIELD

The present invention relates to an optical glass, in particular to an optical glass having refractive index ($n_d$) of 1.60-1.65 and Abbe number ($v_d$) of 62-66, as well as a glass preform made of optical glass, an optical element and an optical instrument.

BACKGROUND

As digital camera, digital vidicon and camera phone continually advance towards higher imaging quality and higher definition, non-spherical lens has been applied increasingly. For this, the glass with medium refractive index, low dispersion and high transmittance has become increasingly popular in the market. In the meantime, in order to reduce processing difficulty and production cost, high-precision molding technology becomes the first choice for applying optical glass to manufacture optical lens. However, the optical glass applicable to high precision molding must be obtained with lower transition temperature, which raises higher requirements for optical glass researchers.

An optical glass disclosed by China Patent (Application No.: 201010554499.2) is unfavorable to high-precision molding because its glass-transition temperature (GTT) is about 600° C.

An optical glass recorded in JP 2004-217513 is low in glass transmittance due to higher $Nb_2O_5$, $Bi_2O_3$ and $WO_3$ contents A Chinese patent (Application No.: 201010299001.2) discloses an optical glass containing a variety of $B_2O_3$, which improves the volatility when the glass is molten, and produces insufficient chemical stability and devitrification resistance of glass.

SUMMARY

The technical problem to be solved by the present invention is to provide an optical glass having low transition temperature, high transmittance, and good chemical stability and devitrification resistance, wherein the refractive index of the optical glass is 1.60-1.65 and the Abbe number is 62-66.

To solve the technical problem, the invention provides the optical glass comprising components, in weight percentage, as follows: 30-50% of $P_2O_5$, 35-50% of BaO, 2-6% of $B_2O_3$, 0-5% of $La_2O_3$, 0-5% of $Gd_2O_3$, 0.1-5% of $Al_2O_3$, 0.1-5% of $Li_2O$, 2-10% of MgO, and 2-10% of CaO.

Furthermore, the optical glass further comprises: 0-3% of ZnO, 0-8% of SrO and 0-0.5% of $Sb_2O_3$.

Furthermore, composition of the optical glass, by weight percentage, is as follows: 30-50% of $P_2O_5$, 35-50% of BaO, 0-5% of $La_2O_3$, 0-5% of $Gd_2O_3$, 2-6% of $B_2O_3$, 0.1-5% of $Al_2O_3$, 0.1-5% of $Li_2O$, 2-10% of MgO, 2-10% of CaO, 0-3% of ZnO, 0-8% of SrO and 0-0.5% of $Sb_2O_3$.

Furthermore, the content of $P_2O_5$ is 38-42%.
Furthermore, the content of BaO is 39-45%.
Furthermore, the content of $B_2O_3$ is 2.5-4.5%.
Furthermore, the content of $Al_2O_3$ is 1-5%.
Furthermore, the content of $Li_2O$ is 1-3%.
Furthermore, the content of MgO is 4-8%.
Furthermore, the content of CaO is 4-8%.
Furthermore, the content of $Gd_2O_3$ is 0-3% and/or $La_2O_3$ is 0-3%.

Furthermore, $BaO/(P_2O_5+B_2O_3)$ is greater than or equal to 0.9 but less than or equal to 1.5.

Furthermore, $La_2O_3+Gd_2O_3$ is greater than or equal to 0.1% but less than or equal to 8%.

Furthermore, refractive index of the optical glass is 1.60-1.65, and the Abbe number is 62-66.

Furthermore, when the transmittance of optical glass reaches up to 80%, the corresponding wavelength is less than 370 nm, the (power method) water resistance $D_W$ of the optical glass belongs to Type 1, the acid resistance $D_A$ belongs to Type 4, the weather durability belongs to Type 1, and the transition temperature does not exceed 550° C.

A glass preform made of the above-mentioned optical glass.

An optical element made of the above-mentioned optical glass.

An optical instrument made of the above-mentioned optical glass.

The optical glass provided by the invention has the beneficial effects as follows: $P_2O_5$ is applied as the network generation body of glass to give high transmittance to the glass; a large amount of BaO is a key component for improving the transmittance of glass while improving the refractive index and the weather durability of glass; the contents of various components are rationally adjusted to obtain the optical glass with high transmittance, low transition temperature and good chemical stability and devitrification resistance, wherein refractive index of the optical glass is 1.60-1.65 and the Abbe number is 62-66. When the glass transmittance reaches up to 80%, the corresponding wavelength is less than 370 nm, the water resistance $D_W$ of the optical glass belongs to Type 1, the acid resistance $D_A$ belongs to Type 4, the weather durability belongs to Type 1, and the transition temperature does not exceed 550° C., so the optical glass is applicable to optical elements such as high-precision molded aspherical lens, spherical mirror, and raster.

DETAILED DESCRIPTION

Each component of the optical glass provided by the invention is described hereunder, and the content thereof is represented by wt % unless otherwise stated.

$P_2O_5$, the network generation body, is a main element for constituting a glass frame, and its extremely low content is easy to result in glass devitrification resistance deterioration; but extremely high content will get chemical stability down and it is difficult to obtain the expected optical property, so the content of $P_2O_5$ is confined to be 30-50%, preferably 38-42%.

$B_2O_3$ is a necessary ingredient for acquiring high refractive index and low dispersion. When the content of $B_2O_3$ is high, the volatility improves and the chemical stability and devitrification resistance of the glass get worse when glass is molten. As a result, the content of $B_2O_3$ is 2-6%, preferably 2.5-4.5%.

BaO is a necessary ingredient for improving the transmittance, refractive index and weather durability of glass. On the one hand, when the content of BaO is low, the needed optical constant and excellent weather durability cannot be reached; on the other hand, when the content of BaO is extremely high, the glass transition temperature will rise and the chemical stability will get worse. So the content of BaO is 35-50%, preferably 39-45%.

BaO is an important component for improving the transmittance of glass with medium refractive index and low dispersion. To acquire higher transmittance, the inventor has found that there is a certain ratio among BaO, $P_2O_5$ and $B_2O_3$ through concentrate study. When $BaO/(P_2O_5+B_2O_3)$ is less than 0.9, although glass transmittance is increased, the glass is difficult to reach the requirements of medium refractive index and low dispersion; when $BaO/(P_2O_5+B_2O_3)$ is greater than 1.5, a variety of BaO in the glass is easy to destroy the internal structure of glass to worsen the transmittance. As a consequence, when $BaO/(P_2O_5+B_2O_3)$ is 0.9-1.5, the requirements of the glass including medium refractive index, low dispersion and low transmittance can be met.

$La_2O_3$ can be used for improving the transmittance, chemical stability and durability of the glass. If the content of $La_2O_3$ is extremely high, glass transition temperature will rise and devitrification resistance will get worse. Therefore, the content of $La_2O_3$ is 0-5%, preferably 0-3%.

$Gd_2O_3$ is an effective ingredient for improving glass transmittance and devitrification resistance. If the content of $Gd_2O_3$ exceeds 5%, the glass transition temperature will be improved, and the devitrification resistance will get worse. So its content is 0-5%, preferably 0-3%.

When $Gd_2O_3$ is a necessary ingredient of glass, $La_2O_3$ can be taken as a free adding ingredient. When $La_2O_3$ is a necessary ingredient of glass, $Gd_2O_3$ can be taken as a free adding ingredient. When $La_2O_3$ and $Gd_2O_3$ exist in the glass, the sum of the mass of $La_2O_3$ and $Gd_2O_3$ is 0.1-8%, otherwise the glass transition temperature will rise and the devitrification resistance will get worse.

$Al_2O_3$ is an important component for improving the chemical stability of glass. But when its content is higher than 5%, the melting difficulty of the glass will be improved but the transmittance thereof will be reduced, so the content of $Al_2O_3$ is confined to 0.1-5%.

$Li_2O$ is an essential component of the invention, which not only can lower the transition temperature and density, but also have a stronger flux effect. When the content of $Li_2O$ is lower than 0.1%, the effect for lowering transition temperature is not obvious; when the content is higher than 5%, the devitrification resistance and chemical stability decrease sharply. Therefore, the content of $Li_2O$ is 0.1-5%, preferably 1-3%. The glass provided by the invention only contains $Li_2O$, without $Na_2O$ and $K_2O$. Since the semi-diameter of $Li^+$ is less than the particle radius of $Na^+$ and $K^+$, $Li^+$ in the glass provided by the invention can play a role in accumulation, so the expansion coefficient of glass decreases.

MgO helps to reduce the expansion coefficient and improve the devitrification resistance. A certain amount of MgO is added to effectively reduce glass transition temperature and the temperature of yield point. If the content of MgO is extremely high, the devitrification resistance of glass gets worse significantly, and the liquid phase temperature rises. Thus, the content of MgO is confined to 2-10%, preferably 4-8%.

CaO can improve the chemical stability of glass and has certain flux effect. But when its content is higher than 10%, the devitrification resistance of glass tends to rise. As a result, the content of CaO is confined to 2-10%, preferably 4-8%.

ZnO is an optional ingredient that reduces the crystallization tendency of glass. But its content could not be too high, or the devitrification resistance and chemical stability of glass will be lowered, and dispersion will be improved. As a result, the content of ZnO is confined to 0-3%, preferably 0-2%, and most preferably 0.

SrO is an ingredient for adjusting the optical constant and improving the chemical stability of glass. An approximate amount of SrO can be added into the optical glass, with adding content of 0-8%.

$Sb_2O_3$ is used as a fining agent in the optical glass provided by the invention, with content of 0 to 0.5%.

In the following paragraphs, the performance of optical glass provided in this invention will be described:

The refractive index and Abbe number are measured as per GB/T 7962.1-1987 *Colorless Optical Glass Test Methods—Refractive Index and Coefficient of Dispersion*.

Transition temperature (Tg) is tested as per *Test Methods of Colorless Optical Glass—Linear Thermal Expansion Coefficient, Transition Temperature and Yield Point Temperature* (GB/T 7962.16-1987), namely, placing the tested sample in a certain temperature range, extending straight lines of a low-temperature region and a high-temperature region on the expansion curve of the tested sample for each one degree centigrade rise in temperature, and intersecting the straight lines, wherein the temperature corresponding to the intersection point is Tg.

Test standards for water durability will be presented as follows:

According to the testing method GB/T17129, the leaching percentage is calculated as per the testing formula specified below:

$$D_W=(B-C)/(B-A)*100\%$$

Where:
$D_W$—the leaching percentage of glass (%);
B—the mass of the filter and sample (g);
C—the mass of the filter and eroded sample (g);
A—the mass of the filter (g).

The water durability of the optical glass is classified into six categories as per the calculated leaching percentage, wherein Type 1 index is as follows: leaching percentage $(D_W)<0.04$.

Test standards for acid resistance are presented below:

According to the testing method GB/T17129, the leaching percentage is calculated as per the testing formula specified as follows:

$$D_A=(B-C)/(B-A)*100\%$$

Where:
$D_A$—the leaching percentage of glass (%);
B—the mass of the filter and sample (g);
C—the mass of the filter and the eroded sample (g);
A—the mass of the filter (g).

According to the obtained leaching percentage, the water durability of the optical glass is classified into six categories as per the calculated leaching percentage, wherein Type 4 index is as follows: leaching percentage $(D_A)$ is 0.65-1.20.

Metamorphic layers like blushing are produced on colorless optical glass eroded by atmosphere. The erosion degree of glass surface can be determined by measuring the turbidity difference before and after sample erosion. For this purpose, the glass is processed into the dimension of 30 mm*30 mm*10 mm Two large surfaces are polished until the surface roughness Ra is not higher than 0.025 μm, the surface figure accuracy N is not greater than 3, the surface figure accuracy difference ΔN is less than 0.5; while the remaining surfaces are finely polished. The sample glass is tested by applying an ultrasonic cleaner to wash or cleaning with a mixed solvent of macrofiber cotton, absolute ethyl alcohol that meets GB/T 678 requirements and diethyl ether (1:9) that meets GB/T 12591 requirements; placing in saturated vapor with the relative humidity of 90% after the turbidity $H_0$ of the eroded glass is measured by a turbidimeter with integrating sphere; heating up to 40° C., and alternately circulating once an hour at 40° C.-50° C.; taking out the sample glass after testing for 30 h, and measuring the turbidity $H_1$ of the eroded glass, wherein distilled water for the test is secondary distilled water that meets GB/T 6682 requirements.

Calculation for turbidity difference is as follows:

$$\Delta H = H_1 - H_0 \quad\quad 5$$

Where, $\Delta H$—turbidity difference of sample eroded;
$H_1$—turbidity of tested sample after eroded;
$H_0$—turbidity of tested sample before eroded;

The water durability of the optical glass is classified into four categories as per the turbidity $\Delta H$, wherein Type 1 index is as follows: turbidity difference $\Delta H < 0.3\%$.

The glass is processed into a sample which is 10 mm plus or minus 0.1 mm thick to test the wavelength corresponding to the transmittance of 80%.

After testing, the optical glass provided by the invention has the following performances: the refractive index ($n_d$) is 1.60-1.65, and the Abbe number ($v_d$) is 62-66; when the transmittance reaches up to 80%, the corresponding wavelength is below 370 nm, the transition temperature (Tg) does not exceed 550° C., the water durability $D_W$ belongs to Type 1, the acid durability $D_A$ belongs to Type 4, and the weather durability belongs to Type 1. Therefore, the optical glass is applicable to high-precision molded aspheric optical elements with low cost and high yield.

The invention also provides an optical preform and optical element made of the optical glass with the method that is well known by a person skilled in the art. Moreover, the optical preform and the optical element can be applied to digital cameras, digital vidicons and camera phones.

EMBODIMENTS

To further understand the technical scheme of the present invention, embodiments of the optical glass provided herein will be described as below.

What shall be noted is that these embodiments do not limit the scope of this invention.

The optical glasses (Embodiments 1-40) shown in Tables 1-4 are formed by weighting based on the proportion of each embodiment in Tables 1 to 4, mixing the ordinary raw materials for the optical glass (such as oxide, hydroxide, phosphate, metaphosphate, carbonate and nitrate), placing the mixed raw materials in a crucible, melting within a certain temperature, obtaining homogeneous molten glass without bubbles and undissolved substances after melting and clarification, shaping the molten glass in a mold, and performing annealing.

Tables 1 to 4 indicate the composition, refractive index ($n_d$), Abbe number ($v_d$), water durability $D_W$, acid durability $D_A$, weather durability, glass transition temperature (Tg) and wavelength $\lambda 80$ corresponding to the transmittance of 80% in Embodiments 1-40 of the present invention. The composition of each component is represented by wt % in such tables.

TABLE 1

| Composition | Embodiments | | | | |
| --- | --- | --- | --- | --- | --- |
| | 1 | 2 | 3 | 4 | 5 |
| $P_2O_5$ | 31.8 | 34.91 | 38.25 | 40.32 | 39.88 |
| $La_2O_3$ | 4.83 | 0 | 2.45 | 1.78 | 1.55 |
| $Gd_2O_3$ | 0 | 4.75 | 0 | 0 | 0 |
| $La_2O_3 + Gd_2O_3$ | 4.83 | 4.75 | 2.45 | 1.78 | 1.55 |
| BaO | 44.98 | 43.15 | 41.8 | 40.43 | 39.8 |
| $B_2O_3$ | 2.5 | 6 | 2.05 | 3.53 | 3.85 |
| $BaO/(P_2O_5 + B_2O_3)$ | 1.31 | 1.05 | 1.04 | 0.92 | 0.91 |
| $Al_2O_3$ | 4.88 | 2.1 | 2.91 | 1.31 | 1.05 |
| $Li_2O$ | 1.28 | 4.85 | 1.02 | 3.01 | 2.9 |
| MgO | 2 | 2.1 | 8.82 | 4.32 | 4.15 |
| CaO | 7.72 | 2.12 | 2.68 | 5.25 | 5.32 |
| ZnO | 0 | 0 | 0 | 0 | 1.45 |
| SrO | 0 | 0 | 0 | 0 | 0 |
| $Sb_2O_3$ | 0.01 | 0.02 | 0.02 | 0.05 | 0.05 |
| $n_d$ | 1.64897 | 1.64964 | 1.62056 | 1.61975 | 1.62095 |
| $v_d$ | 63.84 | 63.94 | 63.31 | 64.04 | 63.95 |
| $\lambda$ 80(nm) | 369 | 368 | 359 | 359 | 360 |
| $D_W$ | Type 1 | Type 1 | Type 1 | Type 1 | Type 1 |
| $D_A$ | Type 4 | Type 4 | Type 4 | Type 4 | Type 4 |
| Weather durability | Type 1 | Type 1 | Type 1 | Type 1 | Type 1 |
| Tg (° C.) | 546 | 512 | 543 | 530 | 528 |

| Composition | Embodiments | | | | |
| --- | --- | --- | --- | --- | --- |
| | 6 | 7 | 8 | 9 | 10 |
| $P_2O_5$ | 40.15 | 38.16 | 41.27 | 42.17 | 40.83 |
| $La_2O_3$ | 2.02 | 0 | 0 | 0 | 0.59 |
| $Gd_2O_3$ | 0 | 1.51 | 1.01 | 0.98 | 2.46 |
| $La_2O_3 + Gd_2O_3$ | 2.02 | 1.51 | 1.01 | 0.98 | 3.05 |
| BaO | 40.27 | 40.48 | 42 | 42.5 | 42.46 |
| $B_2O_3$ | 3.68 | 3.06 | 2.25 | 2.5 | 2.96 |
| $BaO/(P_2O_5 + B_2O_3)$ | 0.92 | 0.98 | 0.97 | 0.95 | 0.97 |
| $Al_2O_3$ | 1.76 | 2.05 | 1.26 | 2.28 | 1.25 |
| $Li_2O$ | 3.15 | 2.23 | 2.15 | 1.28 | 1.16 |

TABLE 1-continued

| MgO | 3.23 | 5.84 | 5 | 3.27 | 4.25 |
|---|---|---|---|---|---|
| CaO | 4 | 5.03 | 5.04 | 5 | 4 |
| ZnO | 1.7 | 1.62 | 0 | 0 | 0 |
| SrO | 0 | 0 | 0 | 0 | 0 |
| $Sb_2O_3$ | 0.04 | 0.02 | 0.02 | 0.02 | 0.04 |
| $n_d$ | 1.62069 | 1.62181 | 1.61045 | 1.61012 | 1.61627 |
| $v_d$ | 63.89 | 63.95 | 63.90 | 63.87 | 64.14 |
| λ 80(nm) | 361 | 361 | 358 | 356 | 359 |
| $D_W$ | Type 1 | Type 1 | Type 1 | Type 1 | Type 1 |
| $D_A$ | Type 4 | Type 4 | Type 4 | Type 4 | Type 4 |
| Weather durability | Type 1 | Type 1 | Type 1 | Type 1 | Type 1 |
| Tg (° C.) | 528 | 532 | 542 | 543 | 545 |

TABLE 2

| | Embodiments | | | | |
|---|---|---|---|---|---|
| Composition | 11 | 12 | 13 | 14 | 15 |
| $P_2O_5$ | 40.35 | 39.76 | 39.49 | 41.24 | 41.52 |
| $La_2O_3$ | 1.12 | 2.54 | 3.02 | 0 | 0 |
| $Gd_2O_3$ | 2.53 | 1.74 | 0.94 | 2.08 | 2.25 |
| $La_2O_3 + Gd_2O_3$ | 3.65 | 4.28 | 3.96 | 2.08 | 2.25 |
| BaO | 42.23 | 40.39 | 42.15 | 40.46 | 39.9 |
| $B_2O_3$ | 2.78 | 2.35 | 3.01 | 2.43 | 2.16 |
| $BaO/(P_2O_5 + B_2O_3)$ | 0.98 | 0.96 | 0.99 | 0.93 | 0.91 |
| $Al_2O_3$ | 1.06 | 2.21 | 1.16 | 1.31 | 2.07 |
| $Li_2O$ | 1.56 | 1.19 | 1.77 | 2.23 | 1.92 |
| MgO | 3.47 | 4.44 | 4.08 | 5.62 | 4.75 |
| CaO | 4.89 | 4.15 | 4.33 | 3.2 | 4.07 |
| ZnO | 0 | 1.2 | 0 | 1.41 | 1.32 |
| SrO | 0 | 0 | 0 | 0 | 0 |
| $Sb_2O_3$ | 0.01 | 0.03 | 0.05 | 0.02 | 0.04 |
| $n_d$ | 1.61607 | 1.61763 | 1.61914 | 1.61047 | 1.61009 |
| $v_d$ | 63.82 | 63.77 | 63.71 | 63.84 | 63.88 |
| λ 80(nm) | 357 | 358 | 359 | 355 | 355 |
| $D_W$ | Type 1 | Type 1 | Type 1 | Type 1 | Type 1 |
| $D_A$ | Type 4 | Type 4 | Type 4 | Type 4 | Type 4 |
| Weather durability | Type 1 | Type 1 | Type 1 | Type 1 | Type 1 |
| Tg (° C.) | 542 | 546 | 541 | 532 | 535 |

| | Embodiments | | | | |
|---|---|---|---|---|---|
| Composition | 16 | 17 | 18 | 19 | 20 |
| $P_2O_5$ | 40.12 | 40.24 | 40.5 | 41.58 | 41.89 |
| $La_2O_3$ | 0 | 0 | 0 | 1.04 | 1.11 |
| $Gd_2O_3$ | 1.58 | 2.06 | 3.03 | 1.29 | 2.63 |
| $La_2O_3 + Gd_2O_3$ | 1.58 | 2.06 | 3.03 | 2.33 | 3.74 |
| BaO | 42.84 | 43.89 | 43.94 | 40.33 | 40.45 |
| $B_2O_3$ | 3.5 | 3.24 | 3.28 | 2.27 | 2.39 |
| $BaO/(P_2O_5 + B_2O_3)$ | 0.98 | 1.01 | 1.00 | 0.92 | 0.91 |
| $Al_2O_3$ | 0.76 | 0.48 | 2.5 | 1.39 | 2.14 |
| $Li_2O$ | 1.33 | 1.39 | 1.14 | 1.36 | 2.07 |
| MgO | 4.91 | 3.27 | 2.5 | 2.58 | 3.4 |
| CaO | 4.94 | 4.38 | 3.09 | 3.37 | 2 |
| ZnO | 0 | 0 | 0 | 1.77 | 1.9 |
| SrO | 0 | 1 | 0 | 3 | 0 |
| $Sb_2O_3$ | 0.02 | 0.05 | 0.02 | 0.02 | 0.02 |
| $n_d$ | 1.61688 | 1.61752 | 1.61869 | 1.61458 | 1.61007 |
| $v_d$ | 64.27 | 64.02 | 63.92 | 63.97 | 63.74 |
| λ 80(nm) | 356 | 357 | 358 | 357 | 355 |
| $D_W$ | Type 1 | Type 1 | Type 1 | Type 1 | Type 1 |
| $D_A$ | Type 4 | Type 4 | Type 4 | Type 4 | Type 4 |
| Weather durability | Type 1 | Type 1 | Type 1 | Type 1 | Type 1 |
| Tg (° C.) | 546 | 545 | 547 | 544 | 533 |

TABLE 3

| Composition | Embodiments | | | | |
|---|---|---|---|---|---|
| | 21 | 22 | 23 | 24 | 25 |
| $P_2O_5$ | 38.2 | 39.1 | 38.4 | 39.5 | 39.3 |
| $La_2O_3$ | 1.8 | 0.4 | 0 | 0 | 0 |
| $Gd_2O_3$ | 1.6 | 0.7 | 1.6 | 1.5 | 1.5 |
| $La_2O_3 + Gd_2O_3$ | 3.4 | 1.1 | 1.6 | 1.5 | 1.5 |
| BaO | 39.8 | 40.3 | 40.3 | 40.2 | 40.2 |
| $B_2O_3$ | 4.3 | 3 | 3.5 | 5.1 | 5.0 |
| $BaO/(P_2O_5 + B_2O_3)$ | 0.94 | 0.96 | 0.96 | 0.90 | 0.91 |
| $Al_2O_3$ | 2 | 1.5 | 2 | 0.5 | 0.5 |
| $Li_2O$ | 2.3 | 2.3 | 2.3 | 0.6 | 1.6 |
| MgO | 4.2 | 5.2 | 5.0 | 4.0 | 4.3 |
| CaO | 5.8 | 6 | 5.9 | 6.6 | 7.55 |
| ZnO | 0 | 1 | 0 | 1.95 | 0 |
| SrO | 0 | 0.5 | 1 | 0 | 0 |
| $Sb_2O_3$ | 0 | 0 | 0 | 0.05 | 0.05 |
| $n_d$ | 1.62311 | 1.62101 | 1.62210 | 1.61805 | 1.61900 |
| $v_d$ | 64.30 | 63.90 | 63.80 | 64.20 | 64.10 |
| λ 80(nm) | 360 | 359 | 360 | 361 | 362 |
| $D_W$ | Type 1 | Type 1 | Type 1 | Type 1 | Type 1 |
| $D_A$ | Type 4 | Type 4 | Type 4 | Type 4 | Type 4 |
| Weather durability | Type 1 | Type 1 | Type 1 | Type 1 | Type 1 |
| Tg (° C.) | 534 | 532 | 535 | 550 | 542 |

| Composition | Embodiments | | | | |
|---|---|---|---|---|---|
| | 26 | 27 | 28 | 29 | 30 |
| $P_2O_5$ | 40.2 | 43.05 | 40.2 | 46.1 | 40.12 |
| $La_2O_3$ | 2.01 | 3.33 | 1.54 | 1.09 | 1.21 |
| $Gd_2O_3$ | 0 | 0 | 1.62 | 0.25 | 2.66 |
| $La_2O_3 + Gd_2O_3$ | 2.01 | 3.33 | 3.16 | 1.34 | 3.87 |
| BaO | 39.75 | 40.41 | 39.95 | 43.77 | 39.13 |
| $B_2O_3$ | 3.15 | 2.0 | 3.5 | 2.1 | 2.08 |
| $BaO/(P_2O_5 + B_2O_3)$ | 0.92 | 0.90 | 0.91 | 0.91 | 0.93 |
| $Al_2O_3$ | 2.18 | 1.53 | 2.33 | 0.54 | 3.14 |
| $Li_2O$ | 1.16 | 2.05 | 2.24 | 1.18 | 2.24 |
| MgO | 4.28 | 4.03 | 3.37 | 2.37 | 4.2 |
| CaO | 5.76 | 3.58 | 5.22 | 2.56 | 4.17 |
| ZnO | 0 | 0 | 0 | 0 | 0 |
| SrO | 1.5 | 0 | 0 | 0 | 1 |
| $Sb_2O_3$ | 0.01 | 0.02 | 0.03 | 0.04 | 0.05 |
| $n_d$ | 1.61951 | 1.61047 | 1.62073 | 1.60038 | 1.61960 |
| $v_d$ | 63.94 | 64.14 | 64.04 | 65.94 | 63.50 |
| λ 80(nm) | 361 | 355 | 361 | 350 | 360 |
| $D_W$ | Type 1 | Type 1 | Type 1 | Type 1 | Type 1 |
| $D_A$ | Type 4 | Type 4 | Type 4 | Type 4 | Type 4 |
| Weather durability | Type 1 | Type 1 | Type 1 | Type 1 | Type 1 |
| Tg (° C.) | 545 | 538 | 535 | 541 | 536 |

TABLE 4

| Composition | Embodiments | | | | | | | | | |
|---|---|---|---|---|---|---|---|---|---|---|
| | 31 | 32 | 33 | 34 | 35 | 36 | 37 | 38 | 39 | 40 |
| $P_2O_5$ | 38.5 | 38.6 | 38.3 | 38.3 | 39.1 | 42.01 | 41.05 | 40.24 | 41.12 | 41.44 |
| $La_2O_3$ | 1.7 | 0.6 | 0.8 | 0.8 | 0 | 2.36 | 2.15 | 1.27 | 1.38 | 1.56 |
| $Gd_2O_3$ | 1.5 | 1.0 | 1.6 | 2.1 | 0.9 | 1.67 | 0 | 0 | 0 | 0 |
| $La_2O_3 + Gd_2O_3$ | 3.2 | 1.6 | 2.4 | 2.9 | 0.9 | 4.03 | 2.15 | 1.27 | 1.38 | 1.56 |
| BaO | 40.3 | 40.5 | 40.5 | 40.2 | 40.5 | 40.2 | 39.42 | 41.35 | 40.9 | 43.1 |
| $B_2O_3$ | 2 | 2.5 | 4.5 | 4.4 | 3 | 2.18 | 2.4 | 2.7 | 2.46 | 3.01 |
| $BaO/(P_2O_5 + B_2O_3)$ | 1.00 | 0.99 | 0.95 | 0.94 | 0.96 | 0.91 | 0.91 | 0.96 | 0.94 | 0.97 |
| $Al_2O_3$ | 2.2 | 2 | 2 | 1.9 | 2 | 1.28 | 2.23 | 0.37 | 2.16 | 1.93 |
| $Li_2O$ | 2.6 | 2.7 | 2.6 | 2.1 | 2.4 | 2.5 | 2.39 | 2.53 | 2.37 | 1.29 |
| MgO | 5.2 | 5.4 | 4.2 | 4.2 | 5.1 | 3.62 | 4.06 | 5.2 | 5.14 | 4.39 |

TABLE 4-continued

| Composition | Embodiments | | | | | | | | | |
|---|---|---|---|---|---|---|---|---|---|---|
| | 31 | 32 | 33 | 34 | 35 | 36 | 37 | 38 | 39 | 40 |
| CaO | 6 | 6.2 | 5 | 5 | 6 | 3.13 | 4.15 | 5.04 | 4.45 | 3.24 |
| ZnO | 0 | 0 | 0.5 | 1 | 0 | 1 | 2.1 | 1.25 | 0 | 0 |
| SrO | 0 | 0.5 | 0 | 0 | 1 | 0 | 0 | 0 | 0 | 0 |
| $Sb_2O_3$ | 0 | 0 | 0 | 0 | 0 | 0.05 | 0.05 | 0.05 | 0.02 | 0.04 |
| $n_d$ | 1.62306 | 1.62210 | 1.62107 | 1.62105 | 1.61903 | 1.61764 | 1.61832 | 1.62087 | 1.61825 | 1.61723 |
| $v_d$ | 63.5 | 63.4 | 63.9 | 64.2 | 63.8 | 63.98 | 63.89 | 63.83 | 64.00 | 64.14 |
| λ 80(nm) | 360 | 360 | 359 | 360 | 359 | 360 | 360 | 361 | 358 | 357 |
| $D_W$ | Type 1 | Type 1 | Type 1 | Type 1 | Type 1 | Type 1 | Type 1 | Type 1 | Type 1 | Type 1 |
| $D_A$ | Type 4 | Type 4 | Type 4 | Type 4 | Type 4 | Type 4 | Type 4 | Type 4 | Type 4 | Type 4 |
| Weather durability | Type 1 | Type 1 | Type 1 | Type 1 | Type 1 | Type 1 | Type 1 | Type 1 | Type 1 | Type 1 |
| Tg (° C.) | 530 | 529 | 531 | 536 | 535 | 531 | 532 | 530 | 534 | 544 |

Embodiments in Tables 1-4 demonstrate that the inventor obtains the optical glass by rationally adjusting the ratios of all components, wherein the refractive index ($n_d$) is 1.60-1.65 and the Abbe number ($v_d$) is 62-66. When the transmittance reaches up to 80%, the corresponding wavelength is below 370 nm, the transition temperature (Tg) does not exceed 550° C., the water durability $D_W$ belongs to Type 1, the acid durability $D_A$ belongs to Type 4, and the weather durability belongs to Type 1. Therefore, the glass is good in optical and physicochemical properties, thereby being applicable to high-precision molded aspheric optical elements with low cost and high yield.

The invention claimed is:

1. An optical glass, comprising the following components by weight percentage: 30-50% of $P_2O_5$, 39-50% of BaO, 2-4.5% of $B_2O_3$, 0.4-5% of $La_2O_3$, 0-5% of $Gd_2O_3$, 0.1-5% of $Al_2O_3$, 0.1-5% of $Li_2O$, 2-10% of MgO, and 2-10% of CaO; wherein $$0.9 \leq BaO/(P_2O_5+B_2O_3) \leq 1.5.$$

2. The optical glass according to claim 1, wherein the content of $P_2O_5$ is 38-42%.

3. The optical glass according to claim 1, wherein the content of BaO is 39-45%.

4. The optical glass according to claim 1, wherein the content of $B_2O_3$ is 2.5-4.5%.

5. The optical glass according to claim 1, wherein the content of $Al_2O_3$ is 1-5%.

6. The optical glass according to claim 1, wherein the content of $Li_2O$ is 1-3%.

7. The optical glass according to claim 1, wherein the content of MgO is 4-8%.

8. The optical glass according to claim 1, wherein the content of CaO is 4-8%.

9. The optical glass according to any claim 1, wherein the content of $Gd_2O_3$ is 0-3% and/or the content of $La_2O_3$ is 0.4-3%.

10. The optical glass according to claim 1, wherein $$1.1\% \leq La_2O_3+Gd_2O_3 \leq 8\%.$$

11. The optical glass according to claim 1, further comprising: 0-3% of ZnO, 0-8% of SrO and 0-0.5% of $Sb_2O_3$.

12. The optical glass according to claim 1, wherein the refractive index of optical glass is 1.60-1.65 and the Abbe number is 62-66.

13. The optical glass according to claim 1, wherein the optical glass has a transmittance of 80% or more at a wavelength less than 370 nm, the water durability DW of the optical glass is type 1, the acid resistance DA is type 4, the weather durability is type 1, and the transition temperature does not exceed 550° C.

14. A glass preform made of the optical glass according to claim 1.

15. An optical element made of the optical glass according to claim 1.

16. An optical instrument made of the optical glass according to claim 1.

17. An optical glass consisting of the following components by weight percentage: 30-50% of $P_2O_5$, 39-50% of BaO, 0.4-5% of $La_2O_3$, 0-5% of $Gd_2O_3$, 2-4.5% of $B_2O_3$, 0.1-5% of $Al_2O_3$, 0.1-5% of $Li_2O$, 2-10% of MgO, 2-10% of CaO, 0-3% of ZnO, 0-8% of SrO and 0-0.5% of $Sb_2O_3$; wherein $$0.9 \leq BaO/(P_2O_5+B_2O_3) \leq 1.5.$$

* * * * *